(12) United States Patent
Horn (10) Patent No.: US 7,578,247 B2
(45) Date of Patent: Aug. 25, 2009

(54) SEED TANK ACCESS ASSEMBLY FOR PLANTERS

(75) Inventor: Rodney S. Horn, Woodridge, IL (US)

(73) Assignee: CNH America LLC, New Holland, PA (US)

( * ) Notice: Subject to any disclaimer, the term of this patent is extended or adjusted under 35 U.S.C. 154(b) by 108 days.

(21) Appl. No.: 11/771,360

(22) Filed: Jun. 29, 2007

(65) Prior Publication Data

US 2009/0000534 A1 Jan. 1, 2009

(51) Int. Cl.
*A01C 15/00* (2006.01)
(52) U.S. Cl. .................................................. 111/200
(58) Field of Classification Search ........... 111/200, 111/900

See application file for complete search history.

(56) References Cited

U.S. PATENT DOCUMENTS

| 242,694 A | 6/1881 | Reynolds et al. |
| 4,048,959 A * | 9/1977 | Steele ..................... 119/512 |
| 4,416,486 A | 11/1983 | McNaught et al. |
| 5,297,920 A | 3/1994 | Pomerville et al. |
| 5,538,286 A | 7/1996 | Hoff |
| 5,579,660 A * | 12/1996 | Kemper et al. ............. 74/473.3 |
| 5,813,494 A | 9/1998 | Ulschmid et al. |
| 5,941,027 A | 8/1999 | Hallsten |
| 6,581,530 B1 | 6/2003 | Hall et al. |
| 7,134,860 B2 | 11/2006 | Pierik et al. |
| 2003/0084829 A1* | 5/2003 | Lempriere ..................... 111/50 |
| 2003/0110999 A1 | 6/2003 | Meyer et al. |
| 2007/0034450 A1* | 2/2007 | Richey ......................... 182/77 |

FOREIGN PATENT DOCUMENTS

| DE | 3743670 A1 | 7/1989 |
| DE | 19620072 A1 | 11/1997 |
| GB | 2291013 A | 1/1996 |
| RU | 2179385 C2 | 2/2002 |

* cited by examiner

*Primary Examiner*—Christopher J. Novosad
(74) *Attorney, Agent, or Firm*—Rebecca Henkel (57) ABSTRACT

An access assembly for an agricultural planter which includes a platform configured for connection to the agricultural planter, a railing which extends from the platform, and a gate pivotably connected to the railing and which extends from the platform.

15 Claims, 8 Drawing Sheets

\# SEED TANK ACCESS ASSEMBLY FOR PLANTERS

FIELD OF THE INVENTION

The present invention relates to agricultural implements, and, more particularly, to an access assembly for planters with large seed tanks or hoppers.

BACKGROUND OF THE INVENTION

Agricultural planters with larger seed tanks or hoppers require filling with small seed bags, large portable bulk seed hoppers, bulk bags and/or augers. Planters with large seed tanks usually have some kind of steps or ladder and platform to access the seed tanks. The railing on the platform frequently interferes with easy access to the tanks requiring extra effort to carry seed bags up the steps or move them over the railing. Positioning an auger to fill the tanks is made more difficult as the auger may interfere with the railing.

A typical planter may have an elongated tool bar which is supported for movement across and over fields by a plurality of wheels and which is adapted to be towed in a given forward direction by a power source such as an off-highway tractor or the like. A drawbar extends from the tool bar and connects to the tractor. Attached to the tool bar are a plurality of planting/row units spaced at intervals. The larger seed tanks or hoppers typically are supported by a frame which can be connected to the toolbar and/or drawbar, and are generally located in the center of the planter. The seed tanks or hoppers can provide seed to the planting/row units via a plenum, and the row units can additionally include mini-hoppers and/or a granular, or other type, chemical hopper. The access platform discussed above can be generally located at least partially above some of the planting/row units, and may also include access steps or a ladder which extend rearward of the planter and down towards the ground for personnel access to the platform. Another problem with the known agricultural planters is that the steps, ladders or part of the platform can extend over some of the row units, which can make the corresponding row units inaccessible or difficult to service.

What is needed in the art is an access assembly for planters which provide easy access for filling the large seed tanks or hoppers, while additionally providing good access to the planter/row units.

SUMMARY OF THE INVENTION

The invention comprises, in one form thereof, an access assembly for an agricultural planter which includes a platform configured for connection to the agricultural planter, a railing which extends from the platform, and a gate pivotably connected to the railing and which extends from the platform.

In one aspect the gate has an approximately U-shaped web with a first leg connected to a handrail which is connected to a second leg, and a crossbar connected to the first leg and the second leg. At least one hinge can connect the first leg to the railing, and a clasp can connect the second leg to the railing. The platform can include at least one pivotable panel, and the gate is on one side of the pivotable panel(s) and another gate is on the other side of the pivotable panel(s). The second gate can also be pivotably connected to the railing and extends from the platform.

In one embodiment the present invention can further include a ladder extending from the at least one pivotable panel. The ladder can have a first ladder portion fixedly connected to the platform, a second ladder portion pivotably connected to the first ladder portion, and a third ladder portion pivotably connected to the second ladder portion.

The invention comprises, in another form thereof, an agricultural planter which has a toolbar with a plurality of planting units connected thereto, a platform connected to the toolbar, a railing extending from the platform, and a gate pivotably connected to the railing and extending from the platform.

In one aspect the planter gate has an approximately U-shaped web with a first leg connected to a handrail which is connected to a second leg, and a crossbar connected to the first leg and the second leg. At least one hinge can connect the first leg to the railing, and a clasp can connect the second leg to the railing. The platform can include at least one pivotable panel, and the gate is on one side of the pivotable panel(s) and another gate is on the other side of the pivotable panel(s). The second gate can also be pivotably connected to the railing and extends from the platform.

In one embodiment the access assembly of the planter can further include a ladder extending from the at least one pivotable panel. The ladder can have a first ladder portion fixedly connected to the platform, a second ladder portion pivotably connected to the first ladder portion, and a third ladder portion pivotably connected to the second ladder portion.

In some forms, at least one bulk seed tank is connected to the toolbar. The agricultural planter of the present invention can further include at least one frame assembly connected to the toolbar, where each frame assembly supports a corresponding bulk seed tank. At least one cantilever support can be connected to an underside of the platform and a corresponding frame assembly.

The invention comprises, in yet another form thereof, a method of manufacturing an agricultural planter, which includes the steps of: providing a platform and a railing extending from the platform; mounting the platform and railing to a toolbar of the agricultural planter and in proximity to at least one large seed tank of the agricultural planter; and pivotably connecting a gate to the railing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE PREFERRED EMBODIMENT

Referring now to the drawings, and more particularly to FIGS. 1-5, there is shown an agricultural implement 10 in the form of a planter which generally includes an elongated tool bar 12 which is supported for movement across and over fields by a plurality of wheels 14, and which is adapted to be towed by a power source, such as an off-highway tractor or some other motive element (all not shown), which power source is connected to drawbar 16. Attached to tool bar 12 are a plurality of planting units 18 located at regularly spaced intervals along tool bar 12; not all row units 18 being shown in FIG. 1 as there generally are row units at regular intervals from one end of tool bar 12 to the opposite end, including interval points in between. Consequently, the planting units 18 are mounted in side-by-side relation relative to each other along the length of the tool bar 12. Bulk seed tanks 20 can provide seed to planting units 18 via a plenum, or other arrangement. Access assembly 22 provides personnel and other access to bulk seed tanks 20, for filling the tanks 20 through lids 23 with seed from seed bags, an auger, etc., or other maintenance.

Figure 1:
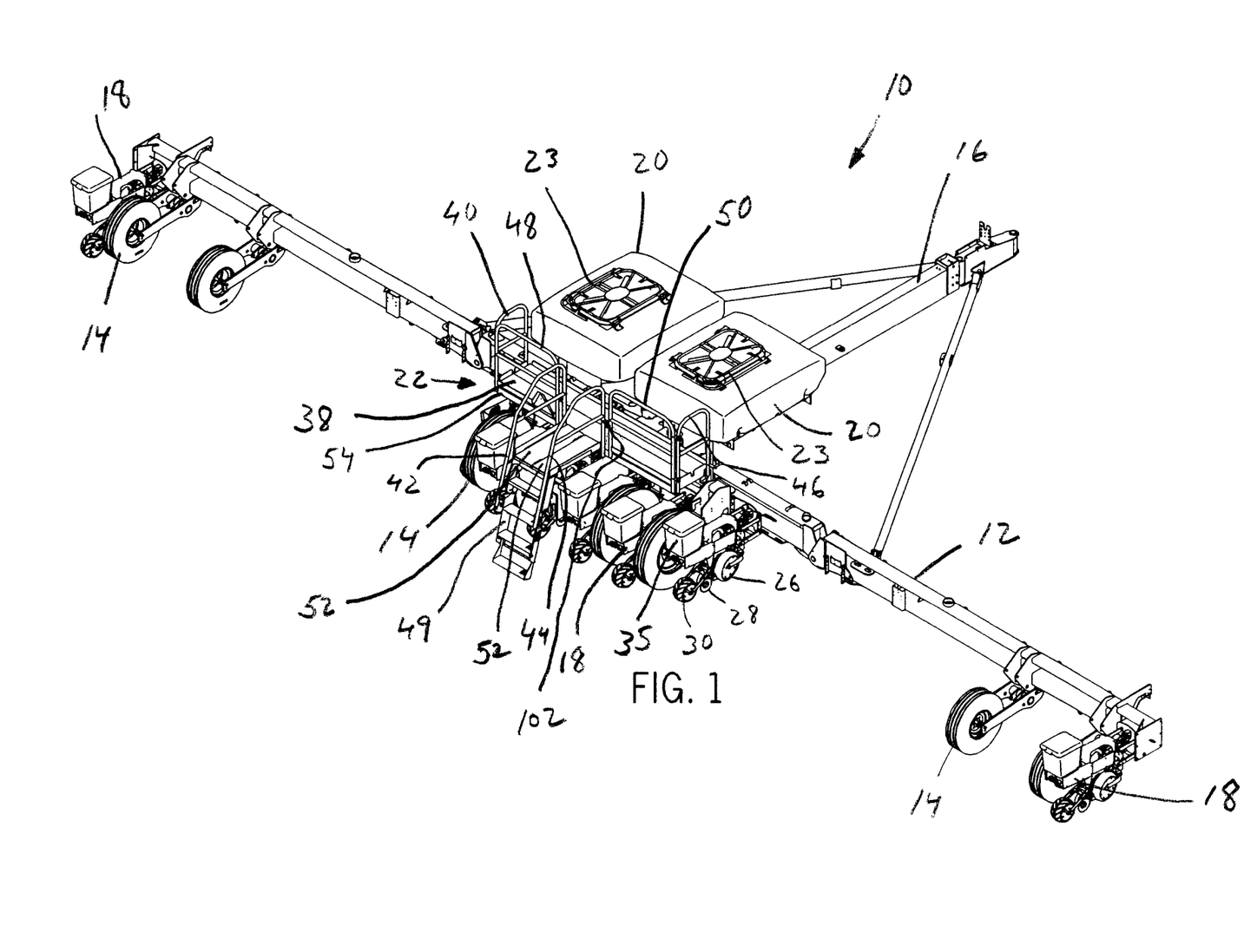
FIG. 1 is a fragmentary perspective view of an agricultural planter with an access assembly according to the present invention.
Figure 2:
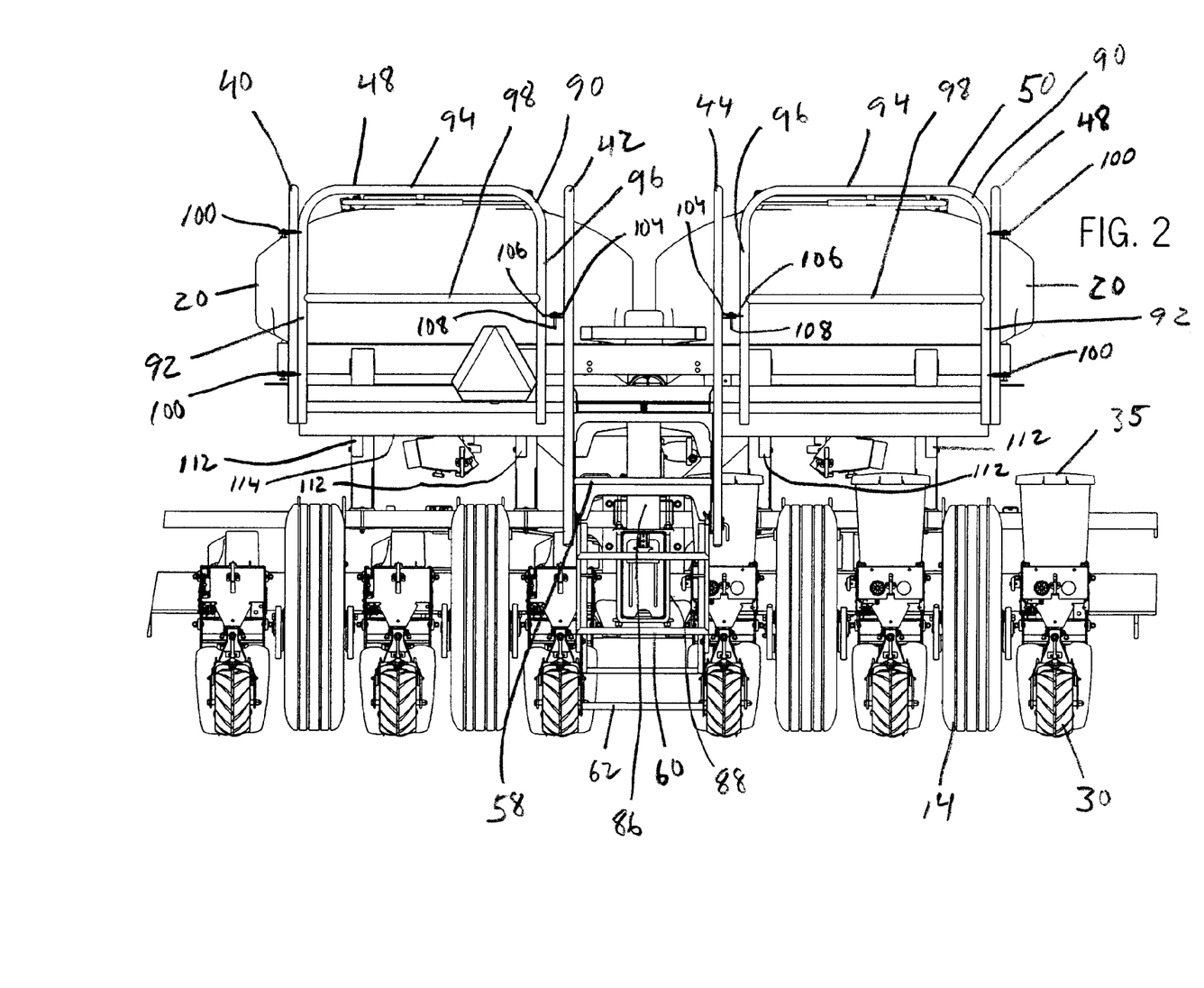
FIG. 2 is a fragmentary rear view of the agricultural planter of FIG. 1.
Figure 3:
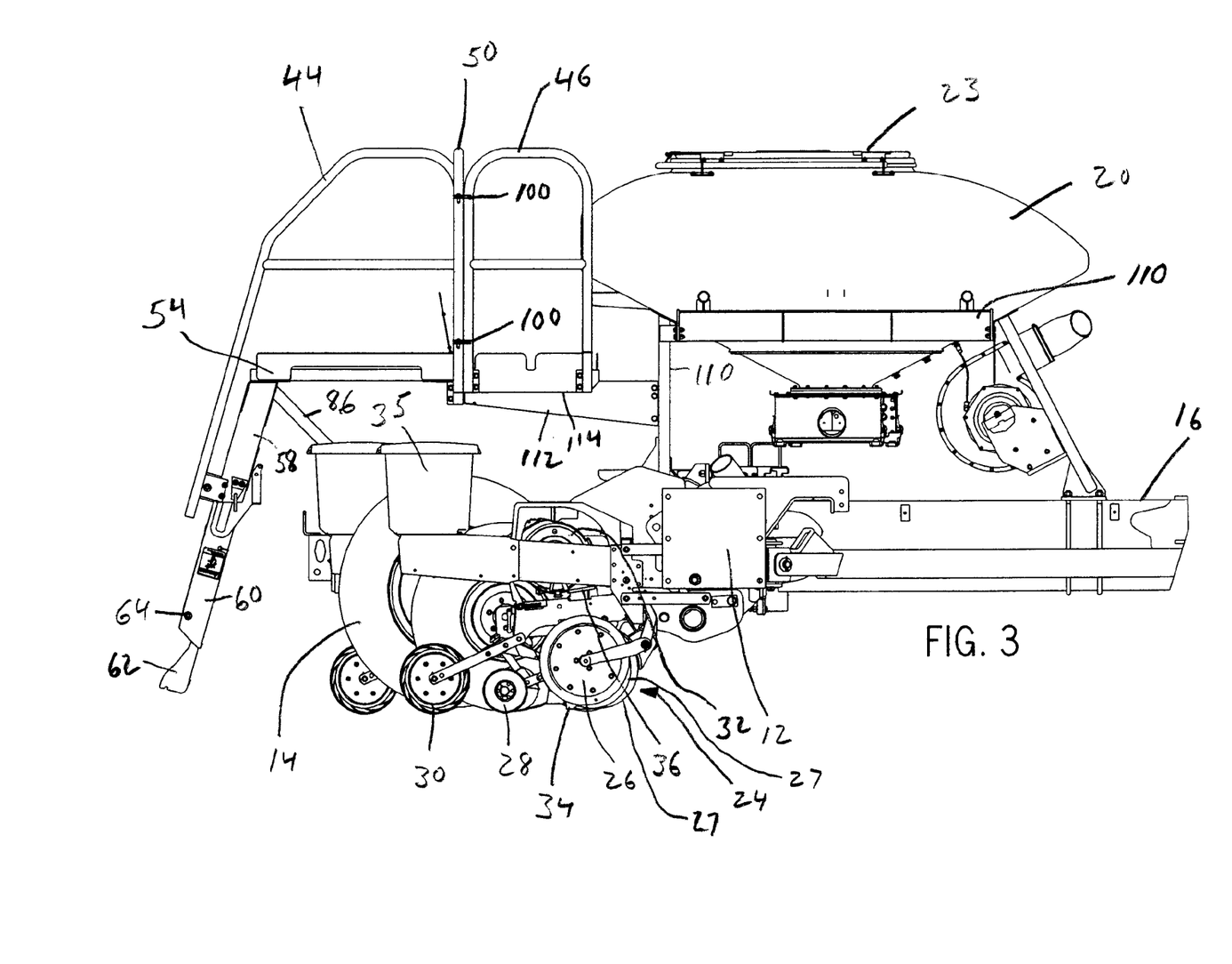
FIG. 3 is a fragmentary side view of the agricultural planter of FIG. 1.

In the illustrated embodiment, each planting unit 18 preferably includes a furrow opening apparatus 24 (FIG. 3). The furrow opening unit 24 can include gage wheels 26, a pair of lateral spaced, or staggered, furrow opener discs 27, or alternatively, and without detracting or departing from the spirit and scope of the present invention, planting unit 18 can be provided with a runner opener type for providing a furrow in the ground. Planting unit 18 further includes a pair of furrow closer discs 28 and a press wheel 30 arranged in fore-and-aft relationship relative to each other.

A seed metering mechanism or apparatus 32 is arranged in receiving relation relative a supply of seed to from hopper 20 through an input port (not shown) arranged generally proximate hopper 20 and, in the illustrated embodiment, forms part of the planting unit 18. The purpose of the seed metering apparatus or mechanism 32 is to uniformly release seeds received from seed hopper 20 at a generally uniform and/or consistent rate for deposit onto the ground. To facilitate delivery of seeds from the seed metering mechanism 32 to the ground, a vertically disposed seed tube 34 is mounted on the planting unit 18 to receive seeds as they are released from metering mechanism 32 through an output port 36. Row unit 18 can include a granular, or other, chemical hopper 35 for depositing chemicals such as fertilizer, pesticides, herbicides and the like along with the seed.

Access assembly 22 generally includes a platform 38 connected to toolbar 12, railing parts 40, 42, 44 and 46 extending from platform 38, a ladder 49 extending from platform 38, and gates 48, 50 pivotably connected to railing parts 40, 46, respectively, and extending from platform 38.

Figure 4:
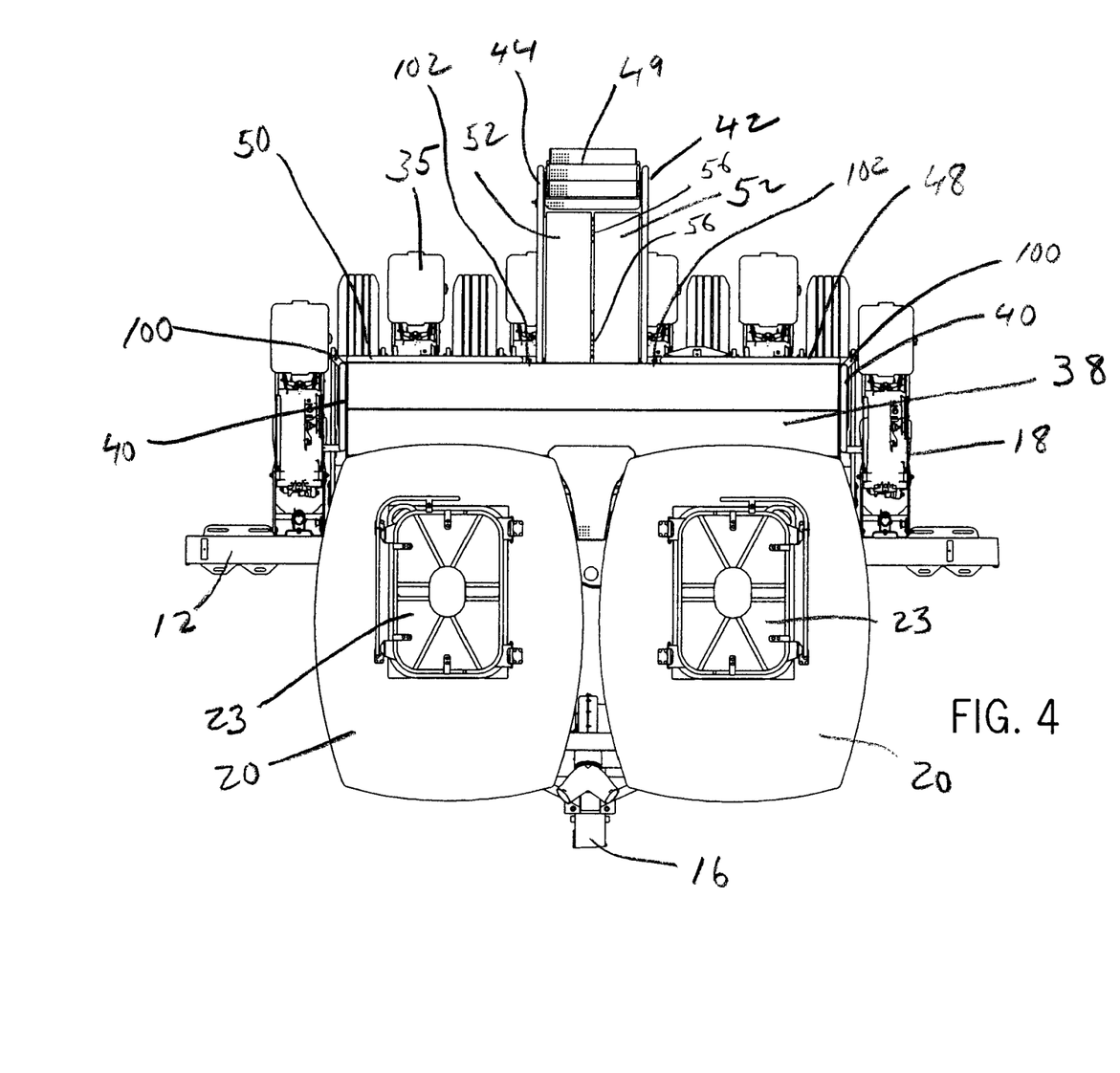
FIG. 4 is a fragmentary top view of the agricultural planter of FIG. 1.
Figure 5:
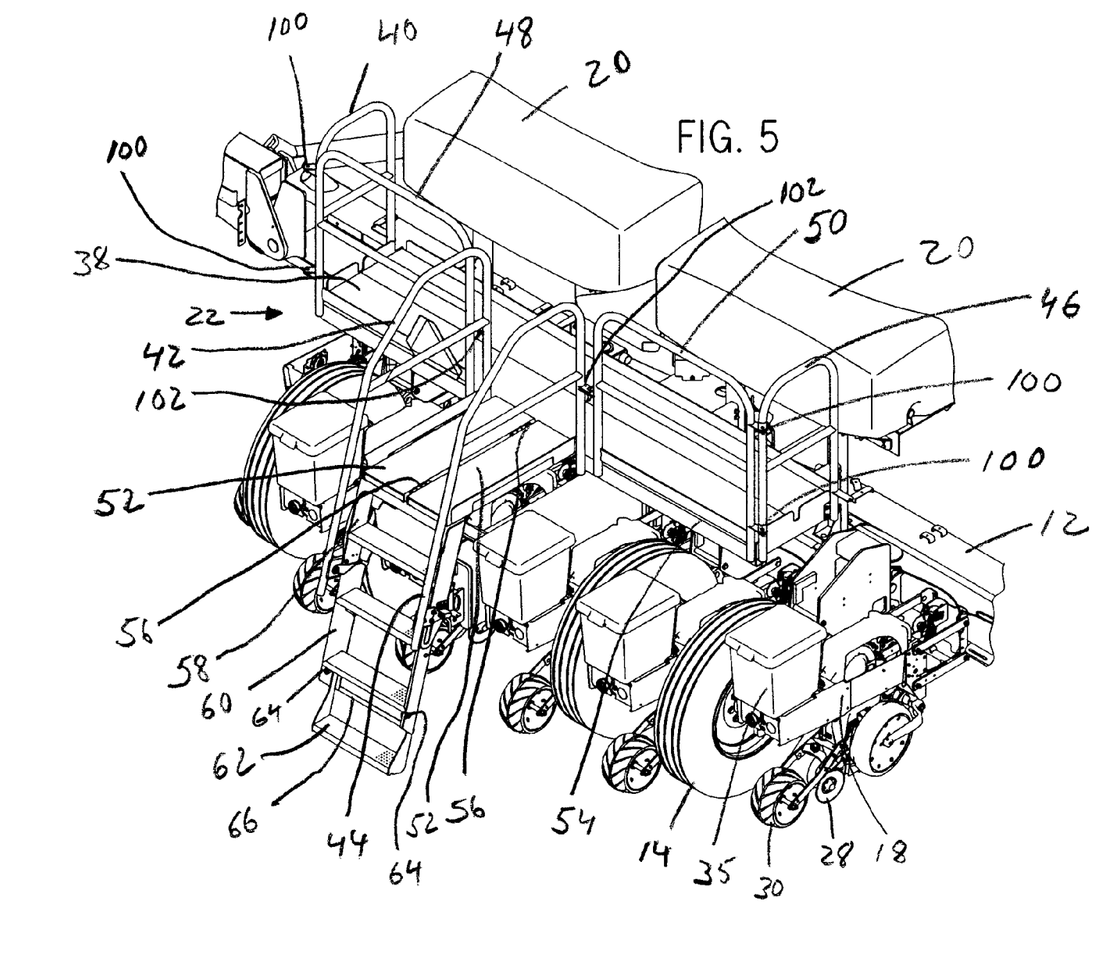
FIG. 5 is a fragmentary perspective view of the agricultural planter of FIG. 1, emphasizing the access assembly according to the present invention.
Figure 6:
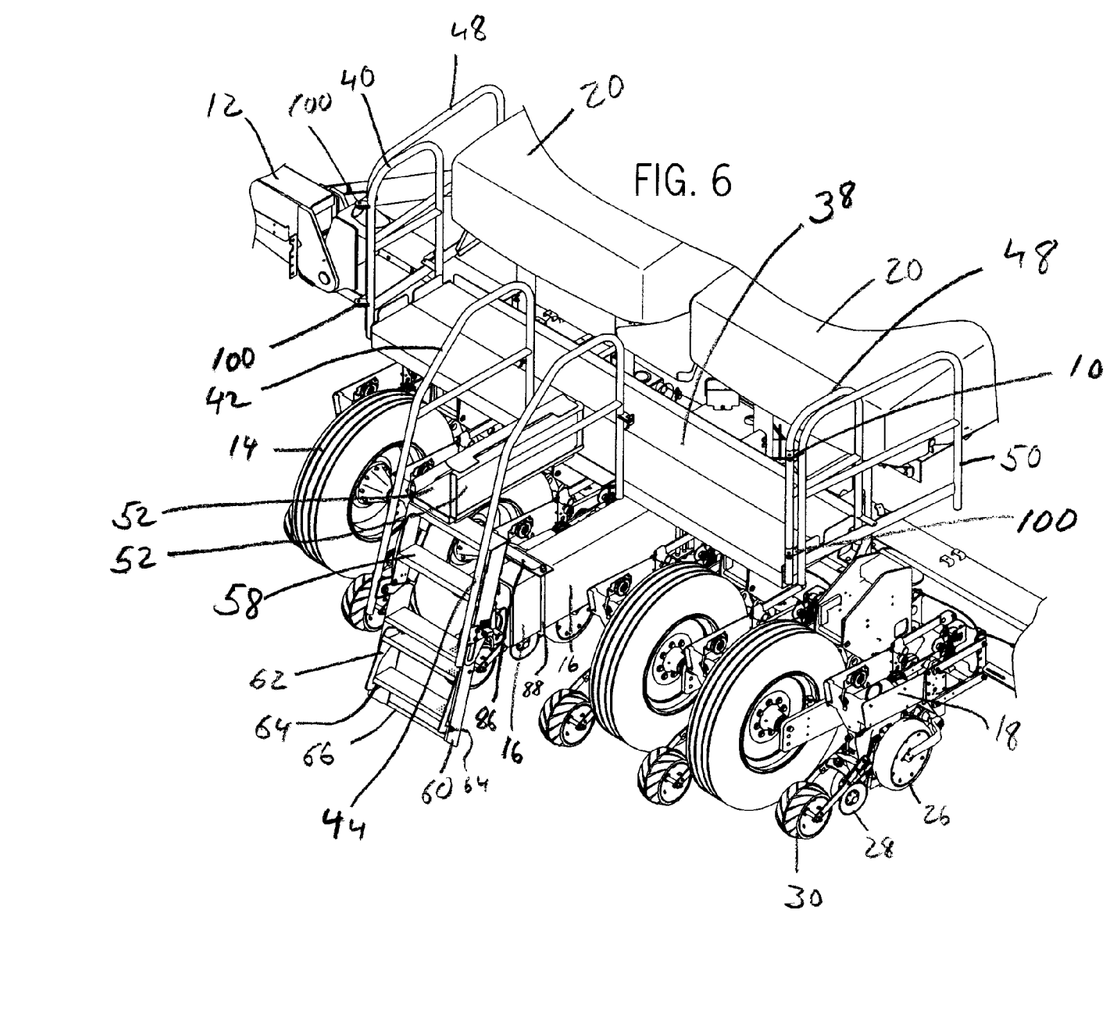
FIG. 6 is a fragmentary perspective view of the agricultural planter similar to FIG. 5, but with the gates in an open position, a pivotable platform panel rotated open, the lower rung of the ladder rotated upward, and some portions of the planting units removed.

The walking surface of platform 38 can be expanded mesh, perforated sheet metal and the like. Platform 38 includes pivotable panels 52 which are pivotably connected to frame 54 of platform 38 using hinges 56 (FIG. 4). Pivotable panels 52 allow access to the chemical hoppers 35 which are under access assembly 22 for filling, cleaning, etc., and also provides access to other parts of the row units 18 which are under access assembly 22. FIG. 6 illustrates gates 48, 50 open and one pivotable panel 52 in an open position.

Figure 7:
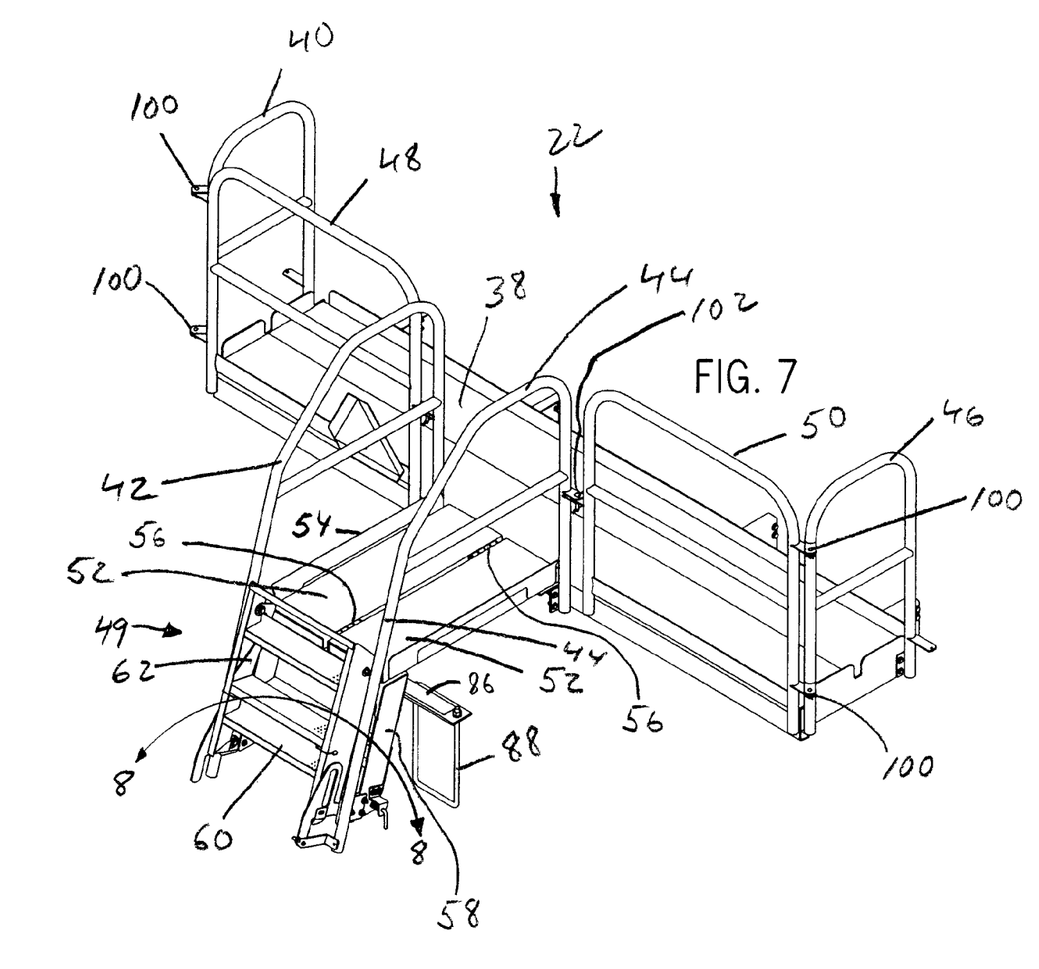
FIG. 7 is a perspective view of the access assembly of FIG. 1, showing both the middle section of the ladder and the lower rung rotated upward.
Figure 8:
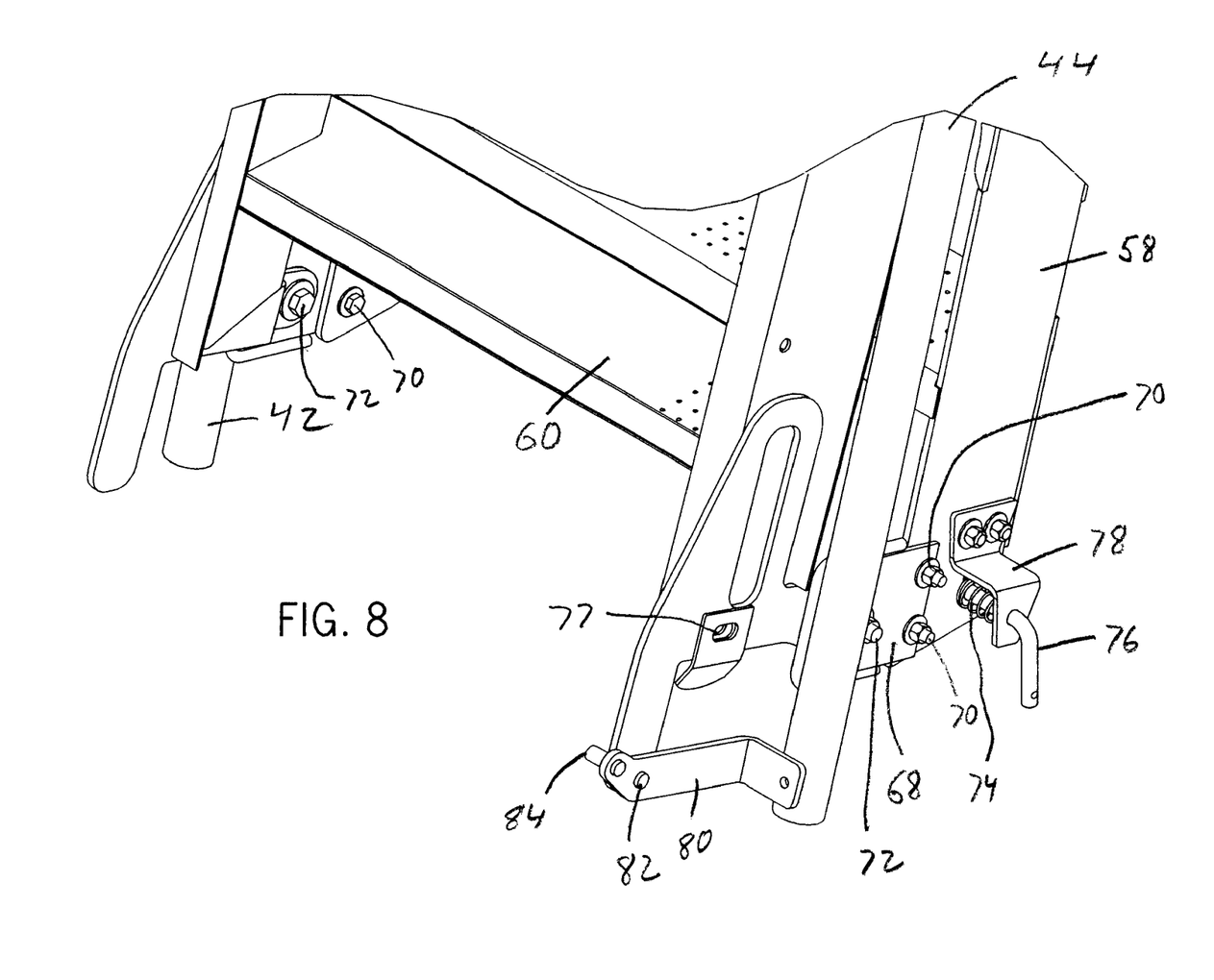
FIG. 8 is a detail view of detail 8-8 in FIG. 7.

Referring more particularly to FIGS. 7 and 8, a ladder 49 extends from pivotable panels 52, and includes a first ladder portion 58 fixedly connected to platform 38, a second ladder portion 60 pivotably connected to the first ladder portion 58, and a third ladder portion 62 pivotably connected to ladder second 60 portion. Third ladder portion 62 nests within ladder second 60 portion when they are in the up position as shown in FIG. 7. Third ladder portion 62 rotates around pins 64. Stop 66 holds third ladder portion 62 from further rotation when in the down position. Plates 68 are connected to first ladder portion 58 using fasteners 70, and second ladder portion 60 rotates about fastener 72. Spring 74 loaded locking pin 76 is held by bracket 78 and locks into a corresponding aperture in second ladder portion 60 to hold second ladder portion 60 in a down position. Brace 80 pivots about pin 82 to and can be positioned against railing part 44 to hold second ladder portion 60 in an up position as shown in FIG. 8. Stop pin 84 holds brace 80 from downward rotation thereby keeping brace 80 holding second ladder portion 60 in the up position. Stay 86 and U-bolt 88 help support ladder 49 and pivotable panels 52.

Gates 48, 50 comprise an approximately U-shaped web 90 (FIG. 2) with a first leg 92 connected to a handrail 94 which is connected to a second leg 96, and a crossbar 98 connected to first leg 92 and second leg 96. At least one hinge 100 connects first leg 92 to the railing 40 or 48. Hinges 100 can be a plate hinge with pin as shown, or other types of hinges. A clasp 102 connects second leg 96 to railing 42 or 44. Clasp 102 can have a bifurcated catch 104 connected to railing 42 or 44, and a tongue 106 connected to a corresponding first leg 92, through which pin 108 is placed in corresponding apertures in catch 104 and tongue 106 to lock a corresponding gate 48, 50 in a closed position.

In some forms the present invention can include at least one frame assembly 110 connected to toolbar 12, where each frame assembly 110 supports a corresponding bulk seed tank 20. At least one cantilever support 112 is connected to an underside 114 of platform 38 and to the corresponding frame assembly 110.

While example embodiments and applications of the present invention have been illustrated and described, including a preferred embodiment, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

I claim:

1. An access assembly for an agricultural planter, comprising:
   a platform configured for connection to the agricultural planter;
   a railing extending from the platform; and
   a gate pivotably connected to the railing and extending from the platform;
   wherein the platform includes at least one pivotable panel;
   wherein the gate is on one side of the at least one pivotable panel, further including a second gate on another side of the at least one pivotable panel, where the second gate is also pivotably connected to the railing and extends from the platform.

2. The access assembly of claim 1, wherein the gate comprises an approximately U-shaped web with a first leg connected to a handrail which is connected to a second leg, and a crossbar connected to the first leg and the second leg.

3. The access assembly of claim 2, further including at least one hinge connecting the first leg to the railing.

4. The access assembly of claim 2, further including a clasp connecting the second leg to the railing.

5. The access assembly of claim 1, further including a ladder extending from the at least one pivotable panel.

6. The access assembly of claim 5, wherein the ladder includes a first ladder portion fixedly connected to the platform, a second ladder portion pivotably connected to the first ladder portion, and a third ladder portion pivotably connected to the second ladder portion.

7. The access assembly of claim 1, further including a ladder extending from the platform, the ladder having a first ladder portion fixedly connected to the platform, a second ladder portion pivotably connected to the first ladder portion, and a third ladder portion pivotably connected to the second ladder portion.

8. An agricultural planter, comprising:
a toolbar having a plurality of planting units connected thereto;
a platform connected to the toolbar;
a railing extending from the platform; and
a gate pivotably connected to the railing and extending from the platform;
wherein the platform includes at least one pivotable panel;
wherein the gate is on one side of the at least one pivotable panel, further including a second gate on another side of the at least one pivotable panel, where the second gate is also pivotably connected to the railing and extends from the platform.

9. The agricultural planter of claim 8, wherein the gate comprises an approximately U-shaped web with a first leg connected to a handrail which is connected to a second leg, and a crossbar connected to the first leg and the second leg.

10. The agricultural planter of claim 9, further including at least one hinge connecting the first leg to the railing.

11. The agricultural planter of claim 9, further including a clasp connecting the second leg to the railing.

12. The agricultural planter of claim 8, further including a ladder extending from the at least one pivotable panel.

13. The agricultural planter of claim 12, wherein the ladder includes a first ladder portion fixedly connected to the platform, a second ladder portion pivotably connected to the first ladder portion, and a third ladder portion pivotably connected to the second ladder portion.

14. The agricultural planter of claim 8, further including at least one bulk seed tank connected to the toolbar.

15. The agricultural planter of claim 14, further including at least one frame assembly connected to the toolbar, each said at least one frame assembly supporting a corresponding said at least one bulk seed tank, at least one cantilever support being connected to an underside of the platform and to a corresponding at least one said frame assembly.

* * * * *